United States Patent [19]

Litten

[11] Patent Number: 5,485,742
[45] Date of Patent: Jan. 23, 1996

[54] TEST SILL FOR RAILCAR CUSHION UNITS

[75] Inventor: Glen L. Litten, Springfield, Oreg.

[73] Assignee: Emerald Hydraulics, Inc., Springfield, Oreg.

[21] Appl. No.: 296,316

[22] Filed: Aug. 24, 1994

[51] Int. Cl.[6] .................................................. G01M 17/00
[52] U.S. Cl. ............................................ 73/11.06; 73/11.01
[58] Field of Search .......................... 73/11.06; 105/420; 213/50, 56

[56] References Cited

U.S. PATENT DOCUMENTS

| 763,098 | 6/1904 | Harding | 105/420 |
|---|---|---|---|
| 1,649,410 | 11/1927 | Johnson et al. | 105/420 |
| 5,325,700 | 7/1994 | Litten | 73/11.06 |

Primary Examiner—Richard Chilcot
Assistant Examiner—Ronald Biegel
Attorney, Agent, or Firm—Klarquist Sparkman Campbell Leigh & Whinston

[57] ABSTRACT

A cushion unit is supported in a test sill for testing by a hydraulic ram tester. The test sill includes a horizontal sill member. A stop block having a receptacle for receiving a rod end of the cushion unit is attachable to the sill member at any of a plurality of positions to accommodate various sized cushion units. A coupler slider slidingly engages guide bars mounted on the sill member, and attaches to another end of the cushion unit. A spring return mechanism mounted to the sill member also attaches to the cushion unit. The cushion unit can be installed in and removed from the test sill without detaching the test sill from the hydraulic ram tester.

19 Claims, 4 Drawing Sheets

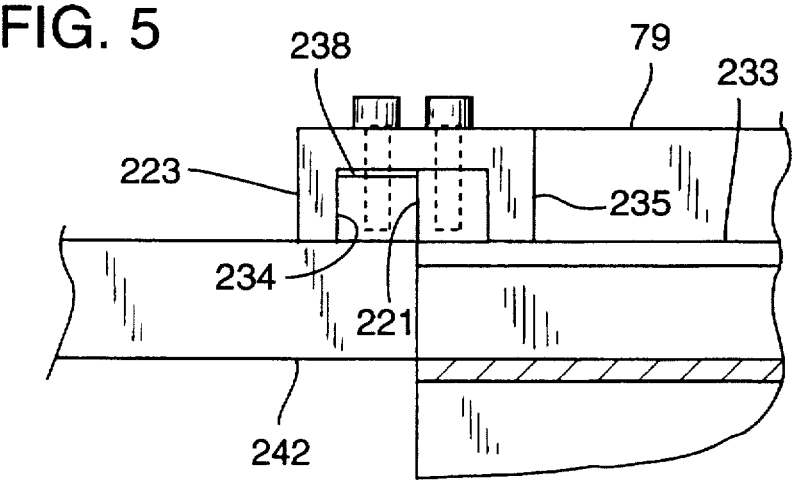
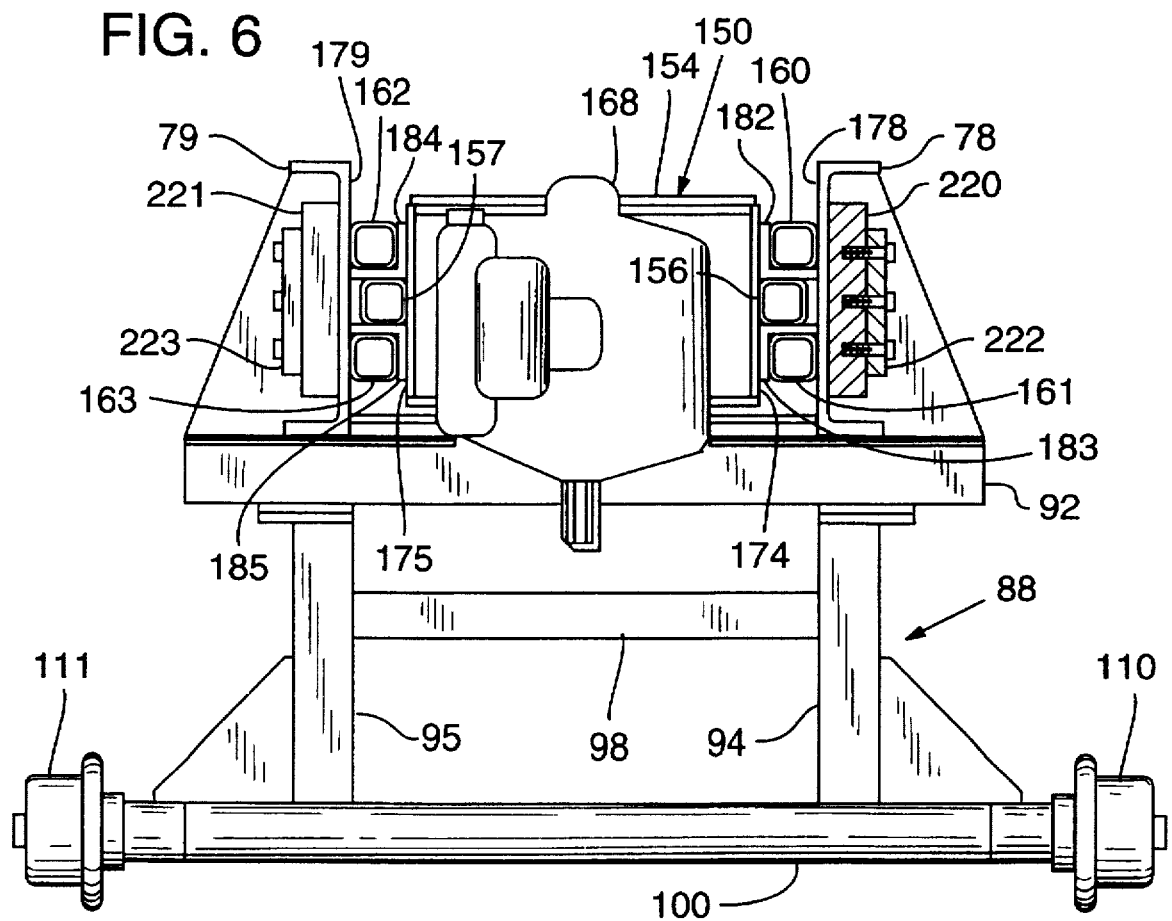

TEST SILL FOR RAILCAR CUSHION UNITS

FIELD OF THE INVENTION

The present invention relates to methods and apparatus for testing-railcar cushion units. More particularly, this invention relates to a method and apparatus for supporting railcar cushion units during testing.

BACKGROUND OF THE INVENTION

In general everyday use, railcars collide together frequently. For example, the railcars of a train in motion generally bump into each other when the train slows or stops. Also, railcar collisions occur when assembling railcars into a train. The difference in velocity between the railcars in such collisions is typically low. However, due to the large mass of the railcars, the railcars collide with sufficient impact energy, unless otherwise absorbed, to cause damage to the railcars and any cargo carried by the railcars even in these collisions at low velocity differences. To absorb the impact of normal railcar collisions, a railcar generally includes cushion units mounted at each end of the railcar between the railcar and its couplers. (In some railcars, a centrally mounted cushion unit and sliding sill are used.)

Currently in common use on railcars are hydraulic cushion units which generally comprise a piston within a cylindrical barrel filled with a hydraulic fluid, typically oil. In general, the devices can be described as non-linear hydraulic shock absorbers. In a railcar collision, the piston is displaced through the barrel. As the piston travels through the barrel, the hydraulic fluid in the barrel is forced by the piston through orifices in the cylindrical wall of the barrel. The action of forcing the fluid through orifices acts to absorb impact energy by heating the fluid. Generally, the amount of force that can be translated into heat energy is proportional to the square of the piston velocity.

Typically, hydraulic cushion units are configured to absorb a constant force throughout the piston stroke by varying the number of orifices through which the fluid vents as the piston is displaced. More specifically, the orifices are distributed along the length of the barrel. Therefore, during the course of the piston's travel through the barrel, the piston bypasses orifices one (or more) by one, leaving fewer and fewer orifices through which the fluid can vent. When the force absorbed by a cushion unit is maintained substantially constant, the rate of change of acceleration is minimal. Thus, this configuration serves to minimize sudden changes in velocity or "jerking" motions of railcars connected in a train. After absorbing an impact, the piston is returned to its initial position in the barrel of the cushion unit by mechanical springs or a gas charged device.

In the typical operating environment, railcar cushion units are subject to failure, particularly in the hydraulic seals, from the wearing of moving parts and from rust and corrosion. Failure also can result from the stress of impacts greater than the rated capacity of the devices. To assure proper functionality of the devices, the performance of the devices is periodically tested.

Various test apparatus are known. U.S. Pat. No. 5,325,700 to Glen L. Litton (also the inventor of the present invention) discloses one railcar cushion unit tester designed to test railcar cushion units which are mounted on a railcar. This railcar cushion unit tester comprises a hydraulic ram which is electronically controlled to move a railcar cushion unit in various test motions. The tester also includes hydraulically actuated clamps mounted on adjustable arms to attach the tester at an end of a railcar whose cushion unit is to be tested.

Testing railcar cushion units while mounted in a railcar, however, tends to be time consuming. For each cushion unit tested, the tester is maneuvered into position next to the railcar containing the cushion unit. Then, the tester's arms are adjusted to properly position the tester's clamps for attachment to the railcar. The clamps are actuated to attach the tester to the railcar. Finally, the hydraulic ram and railcar cushion unit are coupled together. The testing of unmounted railcar cushion units adds even more time to each test for the cushion unit to be installed on a railcar configured to accommodate the cushion unit.

SUMMARY OF THE INVENTION

The present invention provides a method and apparatus for supporting a railcar cushion unit during testing which solves these and other problems associated with prior cushion unit test methodologies. According to the invention, an apparatus for supporting a railcar cushion unit during testing comprises an elongated, horizontal supporting member or sill, and a cylinder stop block attached to the sill. An end of a railcar cushion unit which is to be tested seats in a receptacle on the cylinder stop block. A coupler attaches at a second end of the railcar cushion unit. This supports the railcar cushion unit for testing in a manner simulating installation of the cushion unit in a railcar.

When testing, the sill is attached to a railcar cushion unit tester, such as the tester described by Litton in U.S. Pat. No. 5,325,700. Railcar cushion units can be installed in and unloaded from the sill in a short amount of time, without detaching the tester from the sill. To install a cushion unit in the sill, one end of the cushion unit is seated in the cylinder stop block, and the opposite end is attached to the coupler, such as with a pin. When unloading, the cushion unit is detached from the coupler and lifted out of the sill. The tester need not be detached from the sill during installation or unloading. Accordingly, railcar cushion units can be tested at a much faster rate than was possible with prior test methodologies described above (which required installation of the cushion unit in a railcar and attachment of the tester to the railcar).

According to one aspect of the invention, the cylinder stop block is attachable to the sill in any of a number of predetermined stationary positions. In a preferred embodiment of the invention, the cylinder stop block has a set of pin-holes. The sill also has a plurality of sets of pin-holes in a one-to-one relationship to the predetermined stationary positions. The cylinder stop block can be attached to the sill at any one of the positions by placing lock pins through the stop block pin-holes and one of the sets of sill pin-holes. The sill is thereby adjustable to accommodate railcar cushion units of various sizes and types.

According to another aspect of the invention, the coupler for the sill is mounted on a sliding block ("coupler slider"). The coupler slider has guides for slidingly engaging in guides provided on the sill to permit motion along a longitudinal axis of the installed cushion unit. The coupler slider preferably includes a pin-hole for attachment to the cushion unit being tested. When testing, a coupler on the tester engages the coupler on the coupler slider. The tester can then move the cushion unit through various test motions along the cushion unit's longitudinal axis. Further, the cushion unit can be installed and unloaded from the sill without detaching the couplers. This further reduces the time required to test each cushion unit.

According to yet another aspect of the invention, the apparatus comprises a spring return mechanism. Preferably, the spring return mechanism attaches at a coupler attached end of the railcar cushion unit. After compression of the cushion unit by the tester, the spring return mechanism operates to return the cushion unit to an expanded position.

Additional features and advantages of the invention will be made apparent from the following detailed description of a preferred embodiment which proceeds with reference to the accompanying drawings.

BRIEF DESCRIPTION OF THE DRAWINGS

FIG. 5 is an enlarged fragmentary view, partly in section, of the apparatus of FIG. 2 illustrating a lock clamp for attaching to a railcar cushion unit tester;

FIG. 6 is an enlarged front view of the apparatus of FIG. 2, partly in section, illustrating a coupler slide guide.

DETAILED DESCRIPTION OF THE PREFERRED EMBODIMENT

Figure 1:
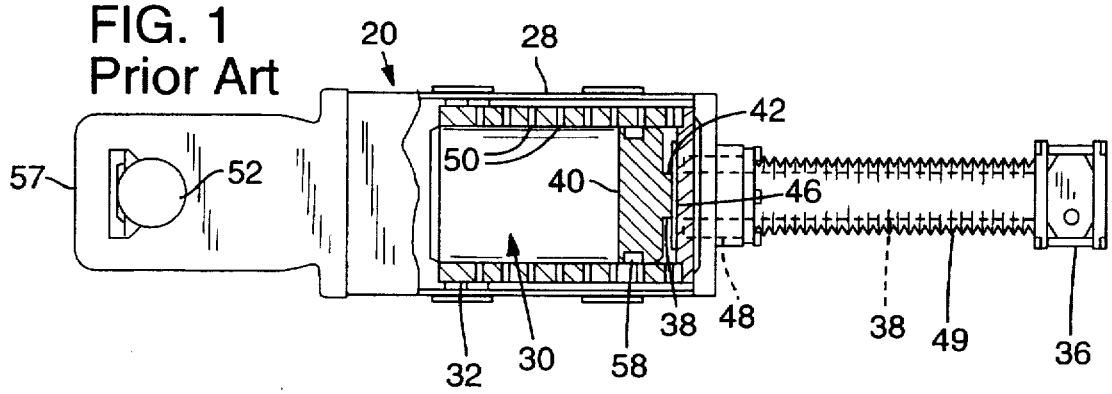
FIG. 1 is an enlarged top view, partly cut away, of a conventional hydraulic cushion unit.

With reference to FIG. 1, a conventional hydraulic, end-of-car coupling cushion unit 20 is generally installed in a railcar (not shown) to absorb the kinetic energy of collisions, such as may occur between railcars. The cushion unit 20 comprises a housing 28 which defines a cavity 30 filled with a hydraulic fluid, preferably a premium anti-wear hydraulic oil such as the ISO series produced by Mobil Corporation. Encased within the cavity of the housing is a cylindrical barrel 32. One end 36 of a rod 38 is fixedly mounted to the railcar. A piston 40 at a distal end 42 of the rod 38 is slidingly received within the barrel 32. The rod extends through suitable seals 46, 48 to prevent oil leakage from the barrel 32 and housing 28 and is encased in an accordion sheath 49 between the housing 28 and end 36.

The cushion unit 20 absorbs the kinetic energy of an impact or collision by transforming the kinetic energy to heat energy. The energy transfer is accomplished by the action of the piston 40 forcing the hydraulic fluid through orifices 50 in the barrel 32. The railcar attaches to other railcars in a train with couplers (not shown). The coupler attaches to the cushion unit 20 with a pin 52 which engages in a cooperative opening in a butt end 57 of the cushion unit. In a railcar collision, the housing 28 of the cushion unit 20, which is normally held in an extended position is moved inwardly toward the railcar (to the right in FIG. 1) by a force applied through the coupler and pin 52 to the butt end 57. The rod 38 and piston 40 remain stationary relative to the railcar because of the fixed mounting of the rod end 36 to the railcar. The piston 40 thus presses against the hydraulic fluid within the barrel 32 forcing the fluid to vent through the orifices 50. The piston 40 is sealed with an O-ring 58 to prevent the fluid from escaping past the piston. In a railcar cushion unit of this type, the amount of impact energy absorbed is generally proportional to the squared velocity of the piston 40 within the cushion unit 20.

As the piston 40 travels through the barrel 32, the piston bypasses the orifices 50 one or more at a time, leaving progressively fewer orifices through which the compressed hydraulic fluid can vent. The progressively smaller stepping of the number of orifices creates a relatively constant resistive force through out the stroke of the piston 40. When the inward force on the cushion unit ceases, the cushion unit 20 is returned to its expanded position with mechanical springs or a gas charged device.

In accordance with a preferred embodiment of the invention illustrated in FIGS. 2–8, a test sill 70 provides an apparatus for supporting a cushion unit during testing, such as the hydraulic cushion unit 20. Although illustrated as supporting hydraulic railcar cushion units under test, it is to be understood that the invention is applicable to the supporting of other types of railcar cushion units including draft gear types.

Figure 2:
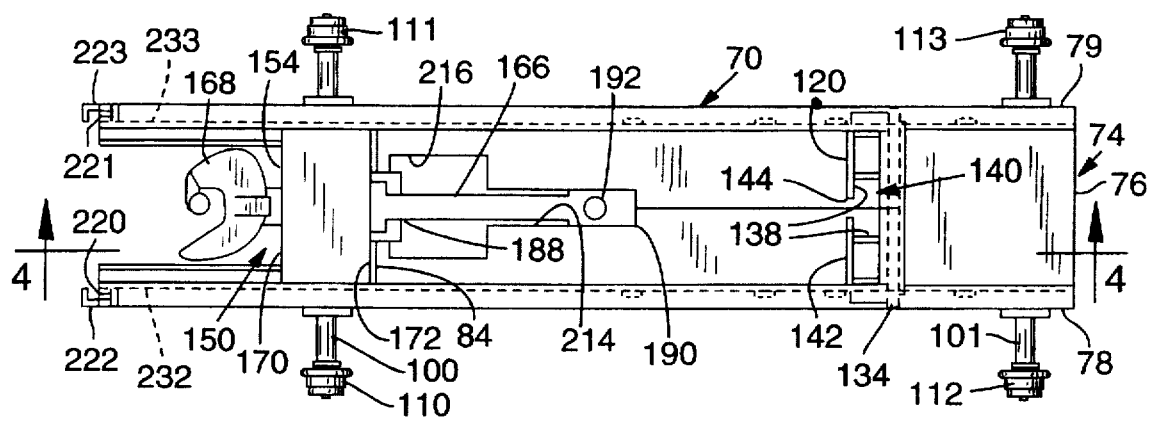
FIG. 2 is a top view of an apparatus according to a preferred embodiment of the invention for supporting railcar cushion units, such of the type shown in FIG. 1, during testing.
Figure 3:
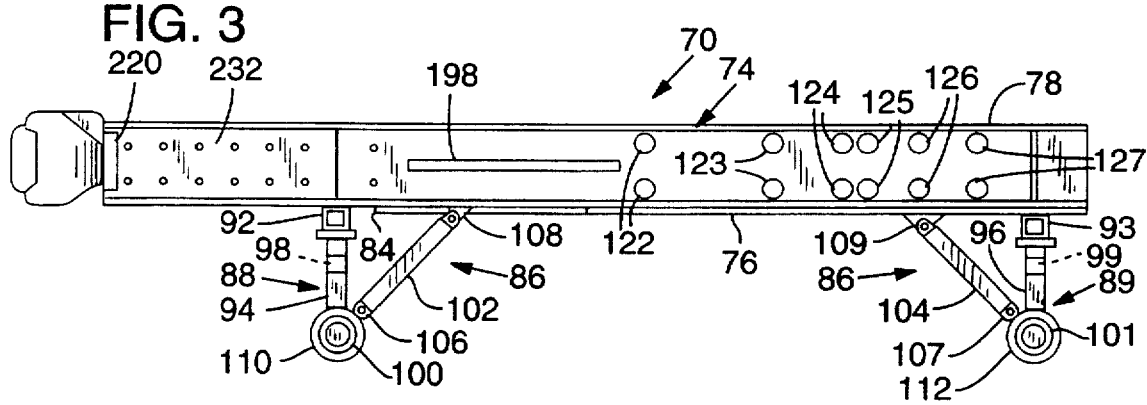
FIG. 3 is a side view of the apparatus of FIG. 2.

Referring in particular to FIGS. 2–3, the test sill 70 preferably comprises an elongated, horizontal support member, for sill member 74. The sill member 74, in the preferred embodiment, is constructed of a sill plate 76, and a pair of channel beams 78–79. The sill plate 76 may be a rectangular metal plate, approximately 33 inches by 120 inches, and ⅜ of an inch thick. The channel beams 78–79 may be 15 inch, U-shaped cross section channels, approximately 168 inches in length. The sill plate 76 is in a horizontal plane, with the two channel beams 78–79 lying on one each of their longitudinal edges on top of, and alongside two opposite longitudinal edges of the sill plate. The channel beams 78–79 are in a uniformly spaced, parallel relationship to each other. The channel beams 78–79 are attached, such as by welding and/or threaded bolts to the sill plate 76. At a front side of the test sill 70, the channel beams 78–79 extend approximately 48 inches beyond one end 84 of the sill plate 76.

Referring particularly to FIGS. 3 and 6, the sill member 74 is supported horizontally on a frame 86. Preferably the frame supports the frame 86 at a height where a cushion unit supported in the test sill 70 is at a height similar to that of a cushion unit installed in a railcar. In the preferred embodiment, the frame 86 consists of front and rear leg assemblies 88–89. Each of the leg assemblies 88–89 includes a top bar 92–93, a pair of vertical leg bars 94–97, a cross bar 98–99, an axle 100–101, and a pair of diagonal struts 102–105. The top bars 92–93 are located laterally and horizontally underneath the sill plate 76, one near each end of the sill plate 76. The top bars 92–93 are mounted at each of their ends atop the leg bars 94–97. The cross bars 98–99 serve as braces between the leg bars of each assembly 88–89, providing support against lateral movement of the leg bars relative to each other. The leg bars 94–97 are mounted atop the axles 100–101, which are oriented horizontally and laterally to the sill member 74. The struts 102–105 are each mounted at one end 106, 107 to the axles 100–101, one at each end of the axles. An opposite end 108, 109 of each strut 102–105 is attached at an underside of the sill plate 76. The struts 102–105 provide support against longitudinal movement of the leg bars 94–97. Preferably, the top bars 92–93, leg bars 94–97, cross bars 98–99, and axles 100–101 are square cross section metal tubes.

In the preferred embodiment, wheels 110–113 are attached at each end of the axles 100–101. The wheels 110–113 are adapted for use on rails for mobility and to facilitate testing of cushion units with the test sill 70 in railroad yards. In alternative embodiments, rubber pads can be attached to an underside of the axles 100–101, and the wheels 110–113 removed, for testing of cushion units in a stationary location off of a railroad track.

Figure 4:
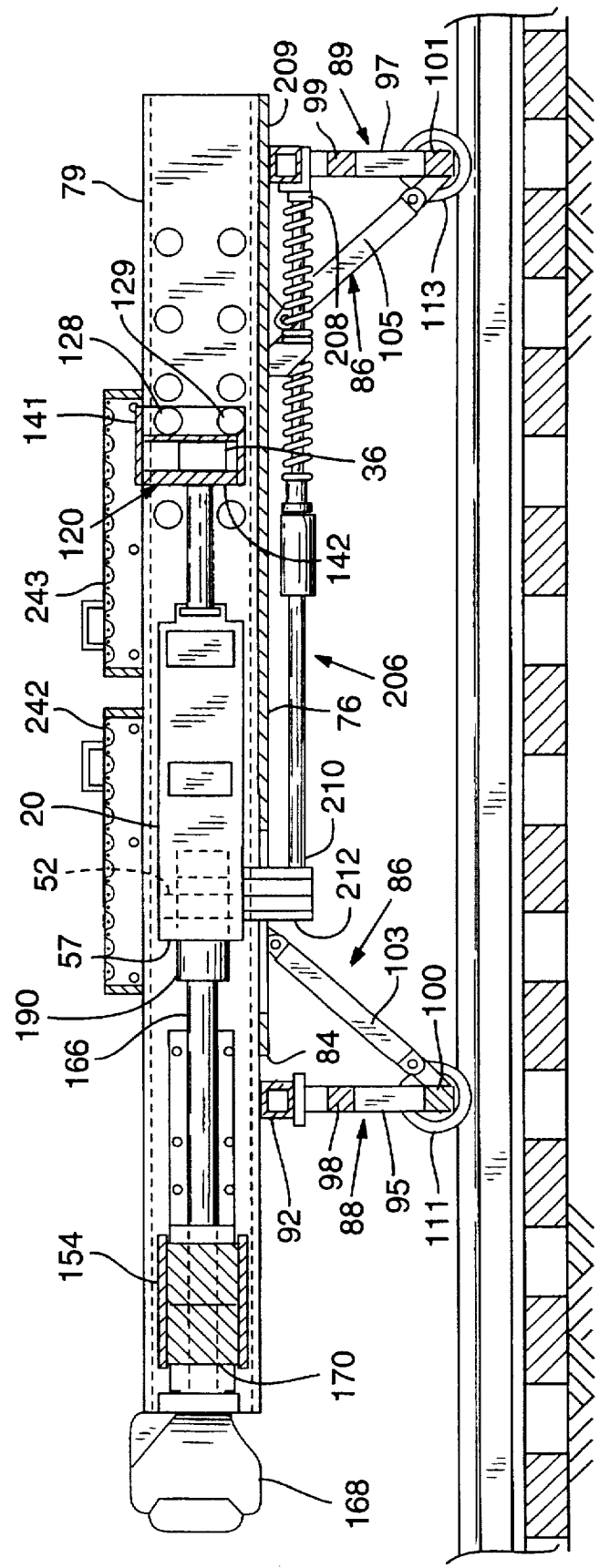
FIG. 4 is a sectional view of the apparatus taken along line 4—4 of FIG. 2.

Referring particularly to FIGS. 2, 3, and 4, the test sill 70 further comprises a cylinder stop block 120. The cylinder stop block 120 fits between the channel beams 78–79. The stop block 120 attaches to the channel beams 78–79 at any of a plurality of predetermined positions along the length of the channel beams 78–79. For attaching the stop block, the channel beams 78–79 have a plurality of sets of pin lock holes 122–127 (FIG. 3), one set for each of the predetermined positions. Each pin lock hole set comprises a first pair of holes in the channel beam 78, one above the other, and a second pair of holes in the other channel beam 79 aligned with the first pair. The stop block 120 also has pin lock holes 128–129. The pin lock holes in the stop block 120, in conjunction with one set of pin lock holes in the channel beams 78–79, are adapted to receive two lock pins 134 which are placed through the holes laterally to the sill member 74. To prevent the lock pins 134 from sliding out of the holes, the lock pins can be provided with a small hole near each end for retaining pins.

Referring particularly to FIGS. 2 and 4, the stop block 120 has walls 138 defining a receptacle 140 adapted to receive the end 36 of the cushion unit 20 (FIGS. 1 and 4). The receptacle 140 is open at a top 141 of the stop block 120 to permit the cushion unit end 36 to be inserted into the receptacle from above. The receptacle walls 138 at a front face 142 of the stop block 120 define a slot 144 having sufficient width to permit the piston rod 38 and accordion sheath 49 of the exemplary cushion unit 20 to extend through the slot. However, the slot width is narrower than that of the piston rod end 36 to prevent the end from forwardly exiting the receptacle 140.

With reference to FIGS. 2–4, the test sill 70 is adjustable to accommodate various configurations of cushion units by attaching the stop block 120 at an appropriate one of its plural positions. For example, in the preferred embodiment, the stop block 120 is attached to the channel beams 78–79 at a set of pin lock holes 122–127 according to the following Table 1 to accommodate particular types of railcar cushion units.

TABLE 1

Stop Block Adjustment for Particular Cushion Unit Types.

| Pin Lock Hole Set | Cushion Unit Type |
| --- | --- |
| 123 | EC10, 10G |
| 124 | EC15 |
| 125 | ME10, E10VM |
| 126 | E10, ME15 |
| 127 | DA20 |

Referring particularly to FIGS. 2 and 6, the test sill 70 also includes a coupler slider 150 which attaches to the butt end 57 of the cushion unit 20 (FIG. 1). The coupler slider 150 consists of a sliding block 154, coupler slide guides 156–157, frame slide guides 160–163, a ram rod 166, and a coupler 168. The coupler 168 is mounted on a front face 170 of the sliding block 154. The ram rod is mounted to a back face 172 of the sliding block 154, and extends directly rearward.

The slide block 154 fits in between the channel beams 78–79 of the test sill 70, with the coupler slide guides 156–157 slidingly received between the frame slide guides 160–163. The coupler slide guides 156–157 are mounted on opposite side faces 174–175 of the slide block 154, and longitudinal to the test sill 70. The frame slide guides 160–163 are mounted longitudinally on inside faces 178–179 of the channel beams 78–79, one pair of slide guides being mounted one above the other on each beam. The coupler and frame slide guides 160–163 preferably are square cross section metal tubes. Additionally, the frame slide guides 160–163 include L-shaped cross section bars 182-185 of a low friction material, such as a UHMW material. These low friction bars fit between the frame slide guides 160–163, and the block 154 and coupler slide guides 156–157, to provide a substantially unrestricted sliding motion.

Referring to FIGS. 2 and 4, a proximal end 188 of the ram rod 166 is mounted to the sliding block 154. At a distal end 190, the ram rod 166 has a pin hole 192 for attachment to the butt end 57 of the cushion unit 20. The ram rod end 190 is received in a cooperative opening in the butt end 57 with pin holes 192 in the cushion unit and ram rod end 190 aligned. A pin received vertically in the pin holes fastens the cushion unit 20 and coupler slider 150 together.

Referring to FIGS. 2 and 3, alternatively, for cushion units adapted for fastening with a cross key holder, the channel beams 78–79 are each provided with a longitudinal cross key slot 198. Such cushion units are fastened to the coupler slider 150 by passing a cross key pin through the cross key slots 198, cushion unit, and ram rod pinhole 192.

Referring to FIGS. 2 and 4, for use with spring return type cushion units, the test sill 70 includes a spring return mechanism 206 (FIG. 4). The spring return mechanism 206 is attached underneath the sill member 74. A proximal end 208 of the mechanism 206 is mounted to the underside of the sill plate 76 at a rear end 209 of the sill member 74. A distal end 210 of the mechanism 206 attaches to a tang or lug 212 on the cushion unit with a pin or bolt. Spring return type cushion units generally have a tang which protrudes downwardly from the butt end. The sill plate 76 has a longitudinal slot or cut-out portion 214 (FIG. 2) through which the tang of the cushion unit extends below the sill plate. Cushion units with a wide lug, such as the D-10 cushion unit, fit in a wider portion 216 (FIG. 2) of the slot 214.

Referring to FIGS. 2, 3, 5 and 7, the test sill 70 also includes lock blocks 220–221 and clamps 222–223 (FIG. 5) for attachment to a railcar cushion unit tester 230 (FIG. 7), such as that disclosed U.S. Pat. No. 5,325,700 to Litton. (The disclosure of U.S. Pat. No. 5,325,700 is incorporated herein by reference.) The lock blocks 220–221 are elongated, square cross section blocks which are mounted vertically on outwardly facing sides 232–233 of the channel beams 78–79 at a front end of the test sill 70. Like lock blocks 238 are provided at a front end 242 of the tester 230. The clamps 222–223 are U-shaped cross-section channels.

Figure 7:
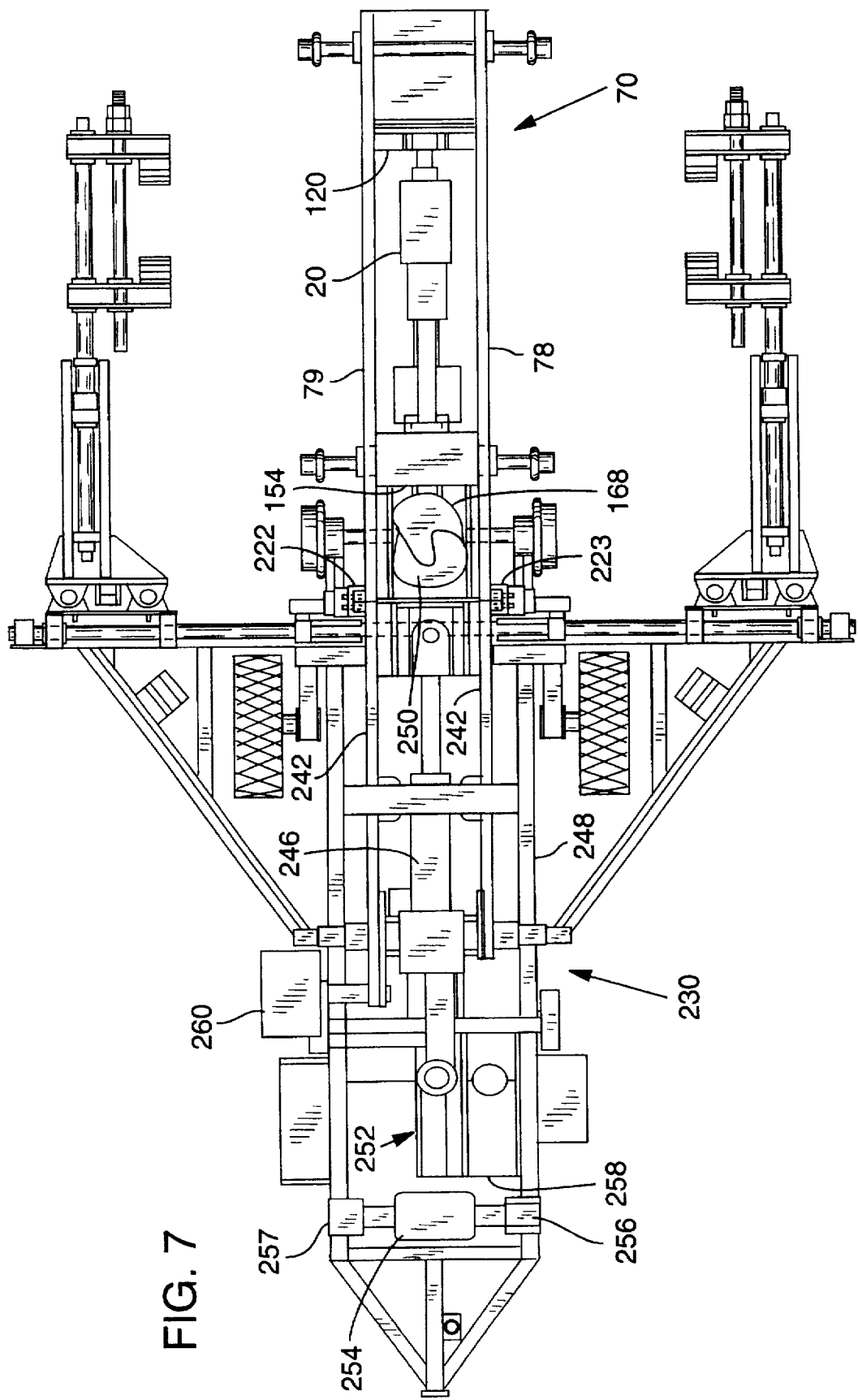
FIG. 7 is a top view of the apparatus of FIG. 2 attached to a railcar cushion unit tester with lock clamps shown in FIG. 5.

With reference to FIG. 7, the tester 230 preferably comprises a hydraulic ram 246 mounted on a wheeled frame 248. A coupler 250 near the front end 242 of the tester 230 is attached to and driven by the hydraulic ram 246. Hydraulic fluid is supplied to the hydraulic ram 248 from a hydraulic system 252 comprising a motor 254, pumps 256, 257, a hydraulic fluid reservoir 258, and accumulators (not shown). Hydraulic fluid is introduced into the hydraulic ram 246 under pressure from the hydraulic system 252 through electrically actuated valves (not shown) under the control of an electronic controller 260. With position and pressure sensors (not shown) attached to the hydraulic ram 246, the electronic controller 260 monitors the motion of the hydraulic ram, and adjusts the valves accordingly so that the hydraulic ram drives the coupler 250 in one or more predetermined motions during testing.

Referring now to FIGS. 5 and 7, the test sill 70 is deployed for use with the tester 230 by placement of the test sill and tester facing each other on a railroad track. The front ends of the test sill 70 and tester 230 are brought together such that the lock blocks 220–221 are adjacent to the like lock blocks 238 on the tester. The clamps 222–223 are then placed over adjacent pairs of lock blocks such that each adjacent lock block pair is between two flanges 234–235 of a clamp 223. The coupler slider 154 is slid forwardly until the coupler 168 engages with the coupler 250 on the tester 230.

Referring again to FIG. 4, to test a particular cushion unit (e.g. cushion unit 20) with the test sill 70, the stop block 120 is adjusted to an appropriate position which accommodates the particular type and size of cushion unit (such as that listed in the above Table 1), and locked in that position by placing the lock pins 134 through the stop block pin holes 128–129 and a set of the channel beams pin lock holes 122–127. The cushion unit is then installed in the test sill 70, by lowering the cushion unit into place between the channel beams 78–79, inserting the cushion unit's piston rod end 36 into the stop block receptacle 140, and attaching the butt end 57 to the coupler slider 150, such as with a pin or cross key holder. If the cushion unit is a spring return type, the cushion unit's tang also is attached to the spring return mechanism 206. This installation procedure can be performed without detaching the tester 230 from the test sill 70.

Referring still to FIG. 4, the test sill 70 of the preferred embodiment also comprises rolling safety guards 242–243. The safety guards 242–243 are square framed screens having rollers (not shown) for rolling longitudinally along the top edges of the channels beams 78–79. The guards 242–243 each have flanges at their bottom outside edges which are rolled under the top edges of the channel beams 78–79. During testing of the cushion unit 20 installed in the test sill 70, the safety guards are rolled into a position over the cushion unit. This prevents an improperly installed cushion unit from being ejected from the test sill 70 during testing.

Having described and illustrated the principles of our invention with reference to a preferred embodiment, it will be recognized that the preferred embodiment can be modified in arrangement and detail without departing from such principles. In view of the many possible embodiments to which the principles of our invention may be put, it should be recognized that the embodiments are illustrative only and should not be taken as limiting the scope of our invention. Rather, we claim as our invention all such embodiments as may come within the scope and spirit of the following claims and equivalents thereto.

I claim:

1. An apparatus for supporting a railcar cushion unit during testing, said cushion unit having first and second ends and being movable between an expanded position and a compressed position, the apparatus comprising:

an elongated, horizontal sill member;

a coupler slider slidingly mounted to said sill member;

a coupler mounted on said coupler slider for coupling to a railcar cushion unit tester;

a stop block attached to the sill member for receiving a first end of said railcar cushion unit;

means for attaching a second end of said railcar cushion unit to said coupler slider; and means for selectively attaching said stop block at any one of a plurality of stationary positions along said sill member.

2. The apparatus of claim 1 further comprising:

said sill member having a plurality of sets of holes, said sets corresponding in a one-to-one relationship to the predetermined stationary positions of said stop block;

said stop block having a set of one or more holes; and a set of one or more pins for being received through said set of stop block holes and one of said sets of holes in said sill member whereby said stop block is attached to said sill member at a desired one of the predetermined stationary positions.

3. An apparatus for supporting a railcar cushion unit during testing, said cushion unit having first and second ends and being movable between an expanded position and a compressed position, the apparatus comprising:

an elongated, horizontal sill member comprising an elongated plate, and a pair of bars supported in a parallel, spaced relationship on said plate;

a coupler slider slidingly mounted to said sill member;

a coupler mounted on said coupler slider for coupling to a railcar cushion unit tester;

a stop block attached to the sill member for receiving a first end of said railcar cushion unit;

means for attaching a second end of said railcar cushion unit to said coupler slider means for selectively attaching said stop block at any one of a plurality of stationary positions along said sill member.

4. The apparatus of claim 3 wherein said beams are channels having a U-shaped cross section.

5. The apparatus of claim 3 wherein:

said beams have a plurality of sets of paired holes, said sets corresponding in a one-to-one relationship to a number of predetermined stationary positions along said sill member;

said stop block having a set of one or more holes; and a set of one or more pins for being received through said set of stop block holes and one of said sets of holes in said beams whereby said stop block is attached to said sill member at a desired one of the predetermined stationary positions.

6. The apparatus of claim 3 comprising:

beam guide bars on an inner face of each of said beams; and slider guide bars on opposite sides of said coupler slider for slidingly engaging in said beam guide bars.

7. The apparatus of claim 6 comprising:

a rod having a first end mounted to a face of said coupler slider opposite said coupler, and a second end; and said second end having a pin-hole for attaching to said railcar cushion unit.

8. The apparatus of claim 3 comprising:

spring means having a first end attached to said sill member and a second end adapted to engage said cushion unit for returning said railcar cushion unit to an expanded position.

9. The apparatus of claim 3 comprising:

a wheeled frame mounted under said sill member for supporting said sill member at a predetermined height.

10. An apparatus for supporting a railcar cushion unit during testing, the cushion unit having first and second ends and being movable between an expanded position and a compressed position, said apparatus comprising:

horizontal, elongated sill member having a pair of beam members extending one along each side in a parallel, spaced relationship;

a stop block having a receptacle for engaging a first end of a railcar cushion unit;

means for selectively attaching said stop block to said sill member between said beam members at a desired one of a plurality of predetermined stationary positions along said beam members;

coupler means for engaging a coupler of a railcar cushion unit tester; and means for attaching a second end of said railcar cushion unit to said coupler means.

11. The apparatus of claim 10 comprising:

a coupler slider supporting said coupler means;

bar guides on an inner face of each of said beam members; and slider guides on opposite sides of said coupler slider for slidingly engaging in said bar guides.

12. The apparatus of claim 10 comprising:

said beam members having a plurality of sets of paired holes, said sets corresponding in a one-to-one relationship to the predetermined stationary positions of said stop block;

said stop block having a set of one or more holes; and a set of one or more pins for being received through said set of stop block holes and one of said sets of holes in said beam members whereby said stop block is selectively attachable to said sill member at the desired one of the predetermined stationary positions.

13. The apparatus of claim 10 comprising:

spring means having a first end mounted on said sill member and a second end adapted to operatively engage said railcar cushion unit for returning said railcar cushion unit to an expanded position after compression of the same during testing.

14. The apparatus of claim 10 comprising:

a wheeled frame mounted under the sill member for supporting said sill member at predetermined height.

15. In combination with a tester for analyzing the performance of a railcar cushion unit, a test sill for supporting the railcar cushion unit during testing by said tester, said railcar cushion unit having first and second ends and being movable between an expanded position and a compressed position, said tester having a frame, a hydraulic ram supported on said frame, a coupler mounted on and driven by said hydraulic ram, a hydraulic system for supplying hydraulic fluid under pressure to said hydraulic ram, and an electronic controller for controlling pressure of the hydraulic fluid in said hydraulic ram, said test sill comprising:

a horizontal, elongated sill member;

means for attaching said sill member to the frame of said tester;

a stop block for engaging the first end of said railcar cushion unit;

means for variably attaching said stop block in any one of a plurality of predetermined stationary positions to said sill member;

a coupler for engaging with the coupler of said tester; and means for attaching the second end of said railcar cushion unit to said coupler of said test sill.

16. The combination of claim 15 wherein said test sill comprises:

a coupler slider, said coupler of said test sill being mounted on said coupler slider;

bar guides on said sill member; and slider guides on said coupler slider for slidingly engaging in said bar guides.

17. The combination of claim 16 wherein said test sill comprises:

a rod having a first end mounted on a face of said coupler slider opposite said coupler of said test sill, and having a second end; and means for attaching to said second end of said railcar cushion unit.

18. The combination of claim 15 comprising:

spring means having a first end mounted on said sill member and a second end adapted to operatively engage said railcar cushion unit for returning said railcar cushion unit to an expanded position after compression of the same during testing.

19. The combination of claim 15 wherein said test sill comprises:

said sill member having a plurality of sets of holes, said sets corresponding in a one-to-one relationship to the predetermined stationary positions of said stop block;

said stop block having a set of one or more holes; and a set of one or more pins for being received through said set of stop block holes and one of said sets of holes in said sill whereby said stop block is attached to said sill at a desired one of the predetermined stationary positions.

* * * * *